(12) United States Patent
Puccini

(10) Patent No.: US 7,916,034 B1
(45) Date of Patent: Mar. 29, 2011

(54) TAMPER-RESISTANT MICROCHIP ASSEMBLY

(75) Inventor: Steven Puccini, Chicago, IL (US)

(73) Assignee: Wine Father LLC, Chicago, IL (US)

( * ) Notice: Subject to any disclaimer, the term of this patent is extended or adjusted under 35 U.S.C. 154(b) by 0 days.

(21) Appl. No.: 12/966,111

(22) Filed: Dec. 13, 2010

Related U.S. Application Data (62) Division of application No. 12/238,824, filed on Sep. 26, 2008.

(60) Provisional application No. 60/999,402, filed on Oct. 18, 2007.

(51) Int. Cl.
*G08B 13/14* (2006.01)

(52) U.S. Cl. ............ 340/572.8; 340/572.1; 40/311

(58) Field of Classification Search ............ 340/572.8, 340/572.1, 572.3, 572.7, 10.1, 10.42; 70/58; 40/311; 215/250, 386
See application file for complete search history.

(56) References Cited

U.S. PATENT DOCUMENTS

| | | | |
|---|---|---|---|
| 6,226,619 B1 * | 5/2001 | Halperin et al. | 705/23 |
| 6,504,481 B2 * | 1/2003 | Teller | 340/572.1 |
| 6,556,139 B2 * | 4/2003 | Manov et al. | 340/572.1 |
| 6,641,052 B2 * | 11/2003 | Baillod et al. | 40/311 |
| 6,746,053 B1 * | 6/2004 | Afzali-Ardakani et al. | 340/572.8 |
| 2006/0139173 A1 * | 6/2006 | Fang et al. | 340/572.7 |
| 2008/0174434 A1 * | 7/2008 | Strauser et al. | 340/572.3 |
| 2008/0272916 A1 * | 11/2008 | Breysse et al. | 340/572.8 |
| 2009/0267729 A1 * | 10/2009 | Rowe et al. | 340/5.8 |
| 2010/0117797 A1 * | 5/2010 | Bauchot et al. | 340/10.1 |
| 2010/0156614 A1 * | 6/2010 | Adstedt et al. | 340/10.42 |
| 2010/0242552 A1 * | 9/2010 | Sayegh et al. | 70/58 |

* cited by examiner

*Primary Examiner* — John A Tweel, Jr.
(74) *Attorney, Agent, or Firm* — Justin Lampel (57) ABSTRACT

The present invention generally relates to a tamper-resistant microchip assembly which may be used to, for example, confirm the authenticity of the source of a product. The tamper-resistant microchip assembly may further contain information related to the origin of the product, vintage, bottle size, geographic origin, age and/or other characteristics of the product. The tamper-resistant microchip assembly is particularly suitable for use with, for example, the production and distribution of wine.

7 Claims, 4 Drawing Sheets

TAMPER-RESISTANT MICROCHIP ASSEMBLY

RELATED APPLICATIONS

This application is a divisional application of U.S. patent application Ser. No. 12/238,824 filed on Sep. 26, 2008, currently still pending, and claims the priority benefit of the same. U.S. patent application Ser. No. 12/238,824 is based on and claims the priority date of provisional application No. 60/999,402 filed on Oct. 18, 2007 and 12/238,824 filed on Sep. 26, 2008, the entire contents of which are herein fully incorporated by reference.

BACKGROUND OF THE INVENTION

The present invention generally relates to a tamper-resistant microchip assembly which may be used to, for example, confirm the authenticity of the source of a product. The tamper-resistant microchip assembly may further contain information related to the origin of the product, vintage, geographic origin, bottle size, age and/or other characteristics of the product. The tamper-resistant microchip assembly is particularly suitable for use with, for example, the production and distribution of wine.

The current trend in technology and industry is to provide Radio Frequency Identification (RFID) tags to automatically identify and locate objects. The system can be used to relay, store and remotely retrieve data using devices called RFID tags or transponders. RFID tags are often attached to or incorporated into a product to identify the product by radio waves. In order for the identification system to work, RFID tags generally contain silicon chips and antennas. Passive tags require no internal power source, whereas active tags require a power source.

Active tags can generally transmit data at a higher power level than passive tags. Accordingly, active tags are more suitable for use in more highly "RF challenged" environments, such as underwater or under a solid surface, such as metal. In addition, active tags can generally be detected at a much farther range than passive tags. For example, it is not uncommon for an active tag to be detectable up to one hundred meters away from the RFID reader. Because active tags require a power source, the battery associated with the active tag will eventually die. However, under certain circumstances, an active tag can have a shelf life of up to 10 years. Another advantage of active tags over passive tags is that active tags are generally capable of storing more data than passive tags. Currently, the smallest active tags are about the size of a coin and cost only a few dollars. Unlike active tags, passive tags obtain their power to activate and respond from the electronic field (radio waves) transmitted by the reader-interrogator.

The RFID tag may contain an electronic microchip having a memory portion, permanently attached to a substrate having a planar antenna. The memory portion stores information and may have a unique identifier number which operates at a specific frequency. Information is uploaded into the memory portion of the RFID tag by means of an external scanner, which may also be used to read the information located in the memory portion of the RFID tag.

Attempts have been made to provide products with tamper-resistant RFID technology. For example, U.S. Pat. No. 7,283,054 to Girvin et al. discloses a method for manufacturing an RFID disabling apparatus using prefabricated, "off-the-shelf" components. The method includes: disposing a prefabricated RFID circuit and a conductive loop on a substrate, coupling a first end of the conductive loop to a first endpoint of the RFID circuit, and coupling a second end of the conductive loop to a second endpoint of the RFID circuit. An optional electronic component can be coupled between the first endpoint and the second endpoint of the RFID circuit. The RFID circuit can be an "off-the-shelf" RFID circuit. A portion of the RFID circuit can be severed to create the first endpoint and the second endpoint.

Further, U.S. Pat. No. 7,277,016 to Moskowitz et al. discloses an invention which relates to wireless portable transponders from unauthorized interrogation by employing a mechanism for disabling reception by or from the antenna of the transponder. Transponders include RFID tags that are attached to items that a person may purchase or carry. Such transponders generally have the ability for receiving and storing electronic and other information, commonly in binary form using memories as in electronic circuits, etc. The invention is designed to provide privacy of electronic information. The tags can be protected from receiving or providing unauthorized or unwanted information. The invention provides a mechanism that permits the owner to decide when reception/interrogation of personal or other information is not desired by employing the provided mechanical disable control.

U.S. Pat. No. 7,168,626 to Lerch et al. discloses an identification device formed from a band of material and a non-reusable tamper-resistant fastening arranged to join opposite end regions of the band. A radio frequency identification (RFID) transponder is disposed on the band. The transponder includes an RFID circuit, such as may be formed on an integrated circuit (IC) chip, and an antenna. First and second electrically conductive traces are coupled to different portions of the RFID transponder. The first and second traces are arranged such that the RFID transponder is disabled when the first and second electrically conductive traces come in contact with one another. Various arrangements of the conductive traces are described to achieve improved security and functionality over the prior art.

However, these patents fail to provide a tamper-resistant microchip assembly which is suitable for use in, for example, the cork of a wine bottle. More specifically, these previous tamper-resistant microchips fail to provide a reliable test for determining the authenticity of, for example, the vintage, geographic origin, age, bottle size and/or producer of a bottle of wine. A need therefore exists for a tamper-resistant microchip assembly which has the features of the present invention. Further, a need exists for a tamper-resistant microchip assembly which may be rendered inoperative the moment a bottle of wine is opened for the first time.

SUMMARY OF THE INVENTION

The present invention generally relates to a tamper-resistant microchip assembly which may be used to: for example, confirm the authenticity of the source of a product, including, for example, the vintage, age or bottle size of the product. The tamper-resistant microchip assembly may further contain information related to the geographic origin of the product and/or other characteristics of the product. The tamper-resistant microchip assembly is particularly suitable for use with, for example, the production and distribution of wine.

An advantage of the present invention is to provide a tamper-resistant microchip assembly which is suitable for use in, for example, the cork of a wine bottle.

An advantage of the present invention is to provide a tamper-resistant microchip assembly which contains a high pressured spring which may permanently destroy the microchip.

Another advantage of the present invention is to provide a tamper-resistant microchip assembly which has a cone for guiding, for example, a cork screw into itself for destruction of the microchip.

A further advantage of the present invention is to provide a tamper-resistant microchip assembly having an anchor used to position and support the assembly within a cork.

Yet another advantage of the present invention is to provide a tamper-resistant microchip assembly which may be destroyed by insertion of a cork screw into a cork.

Still another advantage of the present invention is to provide a tamper-resistant microchip assembly which includes information related to a global positioning system (GPS) location of the producer of a winery producing a wine.

And another advantage of the present invention is to provide a tamper-resistant microchip assembly which includes information related to a specific vintage of production of the contents, for example, of a bottle of wine.

A still further advantage of the present invention is to provide a tamper-resistant microchip assembly which uses the numeric GPS address of a winery, combined with the vintage of production of the contents of the bottle, combined with the winery product number of the contents of the bottle of which the cork with the chips resides, thereby creating a unique, numeric, internationally recognized UPC code, serial number and/or identification number for a given product from a given year and a geographic location via an internationally recognized method for identifying a specific geographic location from a numeric GPS address (the winery). Further, the internationally recognized UPC code, serial number and/or identification number may allow for ascending sequencing based on, for example, location and/or year.

And another advantage of the present invention is to provide a tamper-resistant microchip assembly which may be destroyed even if an Ah so cork screw is used.

For a more complete understanding of the above listed features and advantages of the tamper-resistant microchip assembly reference should be made to the following detailed description of the preferred embodiments and to the accompanying drawings. Further, additional features and advantages of the present invention are described in, and will be apparent from, the detailed description of the preferred embodiments and from the drawings.

DETAILED DESCRIPTION OF THE PREFERRED EMBODIMENTS

The present invention generally relates to a tamper-resistant microchip assembly which may be used to, for example, confirm the authenticity of the source of a product. The tamper-resistant microchip assembly may further contain information related to the product including, but not limited to, the vintage, age, bottle size, geographic origin and/or other characteristics of the product. The tamper-resistant microchip assembly is particularly suitable for use with, for example, the production and distribution of wine.

Figure 1:
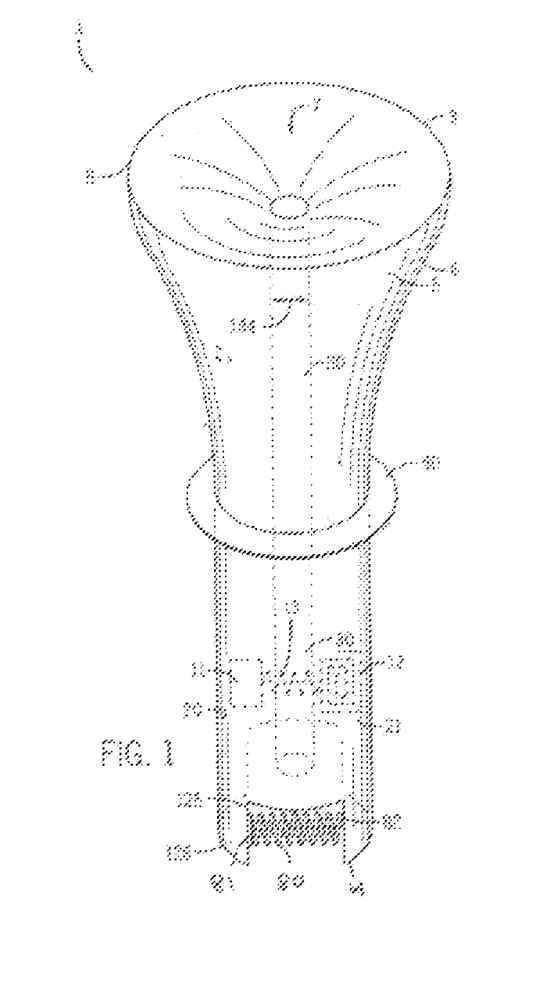
FIG. 1 illustrates a front perspective view of the tamper-resistant microchip assembly of the present invention.
Figure 2:
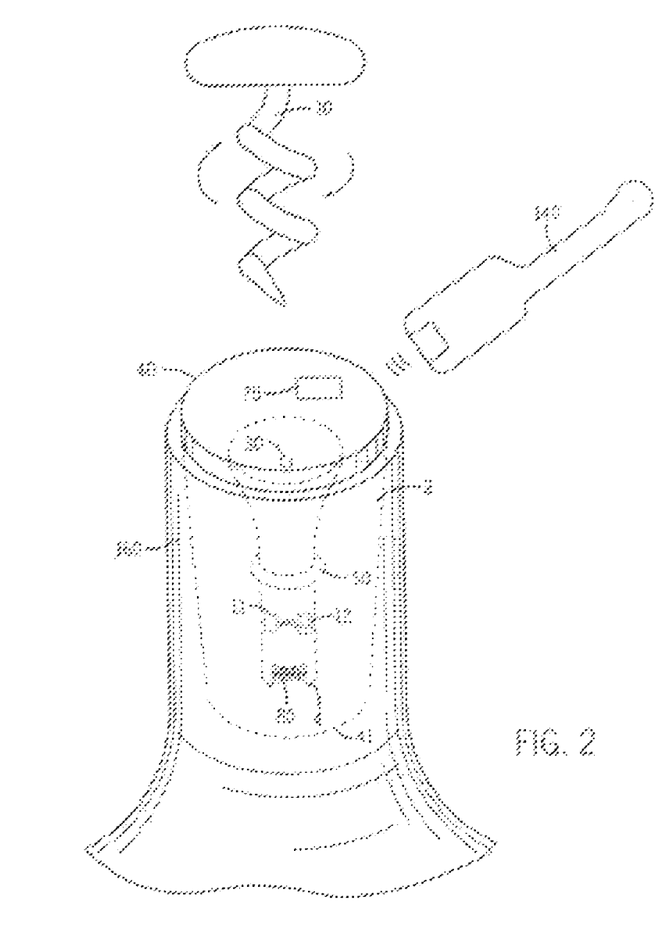
FIG. 2 illustrates a front perspective view of the tamper-resistant microchip assembly of the present invention wherein the assembly is inserted into a cork located within the bottle.
Figure 3:
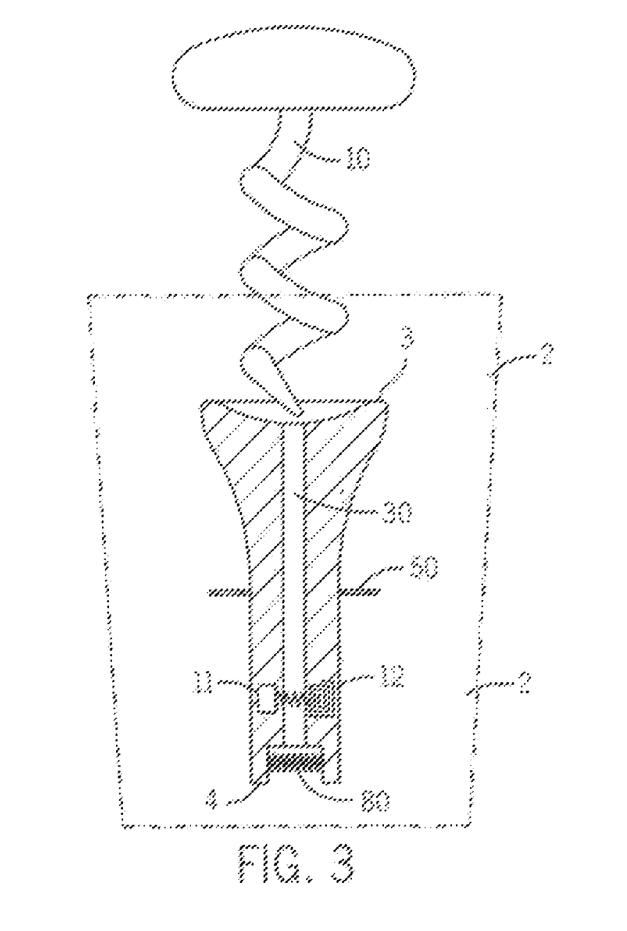
FIG. 3 illustrates a front perspective view of the tamper-resistant microchip assembly wherein a cork is separating the assembly into two halves.

Referring now to the drawings wherein like numerals refer to like parts, FIG. 1 generally illustrates a tamper-resistant microchip assembly 1. The tamper-resistant microchip assembly 1 may be inserted into, for example a cork 2 (FIG. 2). The tamper-resistant microchip assembly 1 may have a top surface 3 and a bottom surface 4. Preferably the tamper-resistant microchip assembly 1 is cylindrical in shape, however, the tamper-resistant microchip assembly 1 may be of any suitable shape depending on its intended function.

The tamper-resistant microchip assembly 1 may be constructed from, for example, plastic, metal, rubber. It should be noted that the tamper-resistant microchip assembly 1 may be constructed from any suitable material for its intended function. Further, different components of the tamper-resistant microchip assembly 1 may be constructed from different materials. The tamper-resistant microchip assembly 1 may further have an interior 5 and an exterior 6. The top surface 3 of the tamper-resistant microchip assembly 1 may have a concave portion 7 and an extended lip portion 8. The extended lip portion 8 may extend beyond the circumference of the remainder of the body of the tamper-resistant microchip assembly 1. The concave portion 7 and the extended lip portion 8 may act as a funnel or cone for guiding, for example, a cork screw 10 (FIG. 2) into the interior portion 5 of the tamper-resistant microchip assembly 1. Preferably, the tamper-resistant microchip assembly 1 and all the components of the assembly are non-toxic and safe if accidentally consumed. Preferably, the extended lip portion 8 is rather large so as to provide a guide for the cork screw 10.

Located within the interior 5 of the tamper-resistant microchip assembly 1 may be, for example, a microchip 11, an antenna 12 and a conductive connector 13. The conductive connector 13 may electronically connect the microchip 11 and antenna 12 such that the microchip 11 may not be read or detected without the microchip 11 being connected to the antenna 12 through the conductive connector 13. Preferably the microchip 11, antenna 12 and conductive connector 13 are rigid enough so as to not be damaged or disabled from normal movement.

The microchip 11 may be, for example, located within the interior 5 of the tamper-resistant microchip assembly 1, near an interior side wall 20 of the tamper-resistant microchip assembly 1. Further, the antenna 12 may be, for example, located within the interior 5 of the tamper-resistant microchip assembly 1 near an interior side wall 21 opposite the microchip 11. The conductive connector 13 may extend through a canal 30, electrically connecting the microchip 11 with the antenna 12. In an embodiment, the microchip 11 and the antenna 12 may be located within the tamper-resistant microchip assembly 1, but not within the canal 30. As a result, an object, such as a cork screw 10, moving through the canal 30 may make contact with and break the conductive connector 13. Breaking of the conductive connector 13 may permanently disable and render inactive the entire microchip/conductor/antenna structure. In an embodiment, the cork screw 10 forces the tamper-resistant microchip assembly 1 to break into two halves by applying pressure on the side walls of the tamper-resistant microchip assembly 1 as the cork screw 10 moves through the canal 30.

When read by a scanner, the microchip 11 may contain information related to, for example, the geographic origin of the source of the product (for example, wine), the type of the product (for example, merlot, cabernet), vintage, bottle size and/or the age of the product. Further, the microchip 11 may have further information related to, for example, a global positioning system (GPS) location of, for example, the winery which produced a wine. The antenna 12 may send out a radio signal (or may be detected by a radio signal depending on whether the chip 11 is a passive or active chip 11) which may allow a scanner 140 (FIG. 2) to read the information stored on the microchip 11. More specifically, the antenna 12 and the chip 11 are activated via inductive coupling which would be introduced due to the proximity of an external RFID reading device designed for such interrogation on a predetermined frequency for said chip 11 in the cork 2. The electrical conductive connector 13 may be necessary for the scanner 140 to detect the chip 11 through the antenna 12. More specifically, if the conductive connector 13 is destroyed, the scanner 140 cannot detect the chip 11 because the chip 11 would not be connected to the antenna 12. This is especially true if the chip 11 was buried in cork 2.

The canal 30 may extend through the interior 5 of the tamper-resistant microchip assembly 1. Preferably, the canal 30 runs vertical through the tamper-resistant microchip assembly 1 (i.e. parallel to the side walls of the tamper-resistant microchip assembly 1). As stated above, the canal 30 may provide a path for the cork screw 10 while the cork screw 10 descends through a top surface 40 (FIG. 2) of the cork 2, down through the upper portion of the cork 2, then through the concave portion 7 at the top surface 3 of the tamper-resistant microchip assembly 1 and through the interior 5 of the tamper-resistant microchip assembly 1. In an embodiment, the canal 30 is hollow to allow a path of least resistance for a cork screw 10, although the canal 30 may be filled with, for example, fake cork, real cork or any other suitable material for guiding the cork screw 10 through the canal 30.

The exterior 6 of the tamper-resistant microchip assembly 1 may have an anchor 50 which may act to guide and/or secure the tamper-resistant microchip assembly 1 within, for example, a cork 2 during the final production of the cork 2. The anchor 50 may generally be in the shape of, for example, a generally flat ring which surrounds the exterior 6 of the tamper-resistant microchip assembly 1. Preferably the anchor 50 is located somewhere near the vertical middle of the tamper-resistant microchip assembly 1, between the top surface 3 and the bottom surface 4 of the tamper-resistant microchip assembly 1. Further, the increased surface area of anchor 50 may provide support to the tamper-resistant microchip assembly 1 so that the tamper-resistant microchip assembly 1 is less likely to accidentally shift during the production of the cork 2 or during transportation and handling of the finished cork 2 prior to or after insertion into a wine bottle 100. The anchor 50 may also prevent the tamper-resistant microchip assembly 1 from inadvertently being extracted from the cork 2 without the cork 2 remaining in tact as a whole.

In use the tamper-resistant microchip assembly 1 may be assembled first and the cork 2 assembled around the tamper-resistant microchip assembly 1. For example, a synthetic cork 2 product may be assembled around the tamper-resistant microchip assembly 1. Further, a particle board micro particle agglomerated or a synthetic polymer cork may be assembled around the tamper-resistant microchip assembly 1 or manufactured or molded. Alternatively, a hole may be drilled into a natural cork 2 and the tamper-resistant microchip assembly 1 inserted within the natural cork 2 and any open space filled with rubber, particle cork, synthetic cork, plastic or any other suitable material. In the finished product, the tamper-resistant microchip assembly 1 may be completely buried within and surrounded by the cork 2. As a result, the tamper-resistant microchip assembly 1 may not be visual upon inspection of the finished cork 2 product. A label 75 may be present upon, for example, the top surface 40 of the cork 2 or on the actual wine bottle itself indicating that the cork 2 contains the tamper-resistant microchip assembly 1. An individual buyer or a retailer may then scan the cork 2 for the buried microchip 11 by using an RFID scanner to determine the authenticity as to the source of the wine or and other important information such as the type and age of the wine.

A spring 80 may be located within the interior 5 of the tamper-resistant microchip assembly 1. The spring 80 is preferably located near the bottom end 4 of the tamper-resistant microchip assembly 1 so that, for example, the spring 80 does not impede the cork screw 10 while the cork screw 10 is descending through the canal 30. The spring 80 may be a high pressured spring 80 compressed within the interior 5 of the tamper-resistant microchip assembly 1. The spring 80 may be generally located in a horizontal manner with respect to the canal 30 such that a first end 81 and a second end 82 of the spring 80 are pushing against an interior wall 125 of the tamper-resistant microchip assembly 1. The interior wall 125 of the tamper-resistant microchip assembly 1 may be at least partly closer to the canal 30 than the interior side wall 20 such that there is a partly solid surface 126 which may support the spring 80. Although the spring 80 may be a compacted high pressure spring 80, the spring 80 may remain inactive until such time as the cork screw 10, or other device, is inserted into the canal 5 of the tamper-resistant microchip assembly 1.

In practice, a user may insert a cork screw 10 into the top surface 40 of the cork 2 and may twist the cork screw 10 so that the cork screw 10 spirals downward from the top surface 40 of the cork 2 toward a bottom surface 41 of the cork 2. As the cork screw 10 penetrates the cork 2, the cork screw 10 will be guided into the interior 5 of the tamper-resistant microchip assembly 1 by the lip portion 8 of the top surface 3 of the tamper-resistant microchip assembly 1. As the cork screw 10 extends into the interior 5 of the tamper-resistant microchip assembly 1, the cork screw 10 will exert pressure on interior walls 144 of the canal 30 of the tamper-resistant microchip assembly 1. As the pressure on the interior walls 144 of the canal 30 increases, the force holding the compressed spring 80 is weakened and the compressed spring 80 may expand thereby breaking the electrical conductive connector 13 connecting the microchip 11 and the antenna 12 and rendering the tamper-resistant microchip assembly 1 unreadable. In addition, the microchip 11 may be physically damaged by the cork screw 10, thereby further disabling the tamper-resistant microchip assembly 1.

In addition to the compressed spring 80 expanding when the cork screw 10 is inserted into the cork 2, the compressed spring 80 may also expand and, thereby disable the tamper-resistant microchip assembly 1, when the cork 2 is removed from the bottle neck 160 by, for example, an Ah so bottle opener. Even though an Ah so bottle opener does not have a shaft which penetrates the cork 2, removal of the cork 2 from the bottle neck 160 by the Ah so bottle opener may still cause the compressed spring 80 to expand as a result of the pressure of the side walls of the bottle neck 160 being removed, thereby causes the breaking of the electrical conductive connector 13 and the disabling of the tamper-resistant microchip assembly 1.

Figure 4:
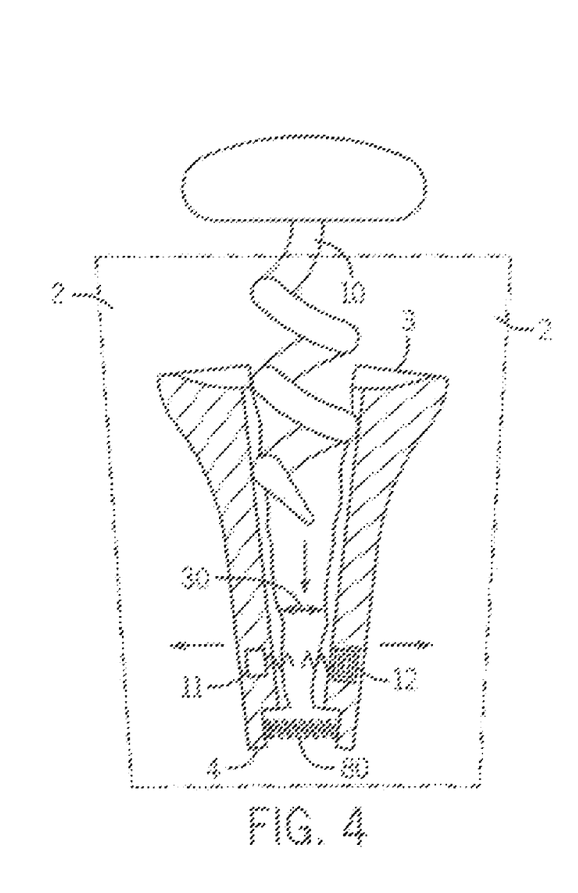
FIG. 4 illustrates a front perspective view of the tamper-resistant microchip assembly for a cork wherein an RFID tag has been disabled.

Referring now to FIG. 4, in an embodiment, the expansion of the compressed spring 80 may cause the tamper-resistant microchip assembly 1 to split into two halves. FIG. 4 illustrates the conductive connector 13 being broken after the cork screw 10 is inserted inward toward the canal 30.

In addition, the tamper-resistant microchip assembly 1 may prevent the intentional or unintentional misidentification of the information (such as the source of production) of the wine or other contents of the bottle. More specifically, if a user removes the cork 2 containing the tamper-resistant microchip assembly 1 the lack of pressure on the cork 2 by the surrounding bottle neck 160 may immediately cause the spring 80 to expand thereby breaking the conductive connector 13. When the conductive connector 13 is broken, the user may not place the cork 2 containing the tamper-resistant microchip assembly 1 into another bottle and still obtain a positive reading from an RFID scanner 140. As a result, a buyer of the bottle would know the bottle has been tampered with.

Figures 5, 6, 7, 8:
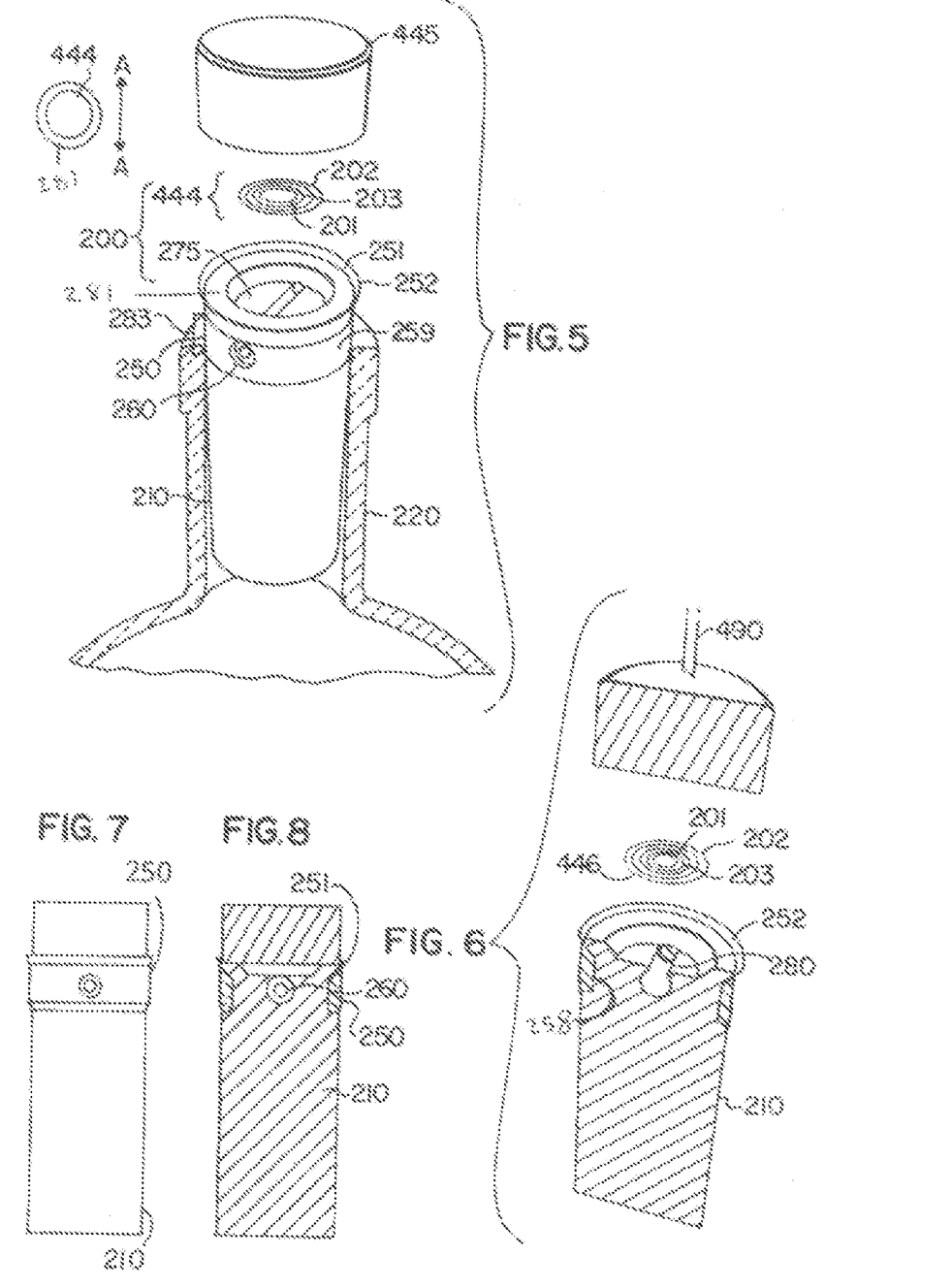
FIG. 5 illustrates an exploded side perspective view of an alternative tamper-resistant microchip assembly in a cork.
FIG. 6 illustrates an exploded side perspective view of an alternative tamper-resistant microchip assembly in a cork.
FIG. 7 illustrates a side view of the cork having a tamper-resistant microchip assembly.
FIG. 8 illustrates a sectional side view of the cork having a tamper-resistant microchip assembly.

FIGS. 5-8 illustrate an alternative embodiment of the tamper-resistant microchip assembly 200. Reference numbers in FIGS. 5-8 should be referred to in the below description. Referring now to FIG. 5, a tamper-resistant microchip assembly 200 may be inserted into, for example, a cork 210. The tamper-resistant microchip assembly 200 may have, for example, a microchip 201, an antenna 202 and a conductive connector 203. The conductive connector 203 may electrically connect the microchip 201 to the antenna 202 so that, for example, a radio frequency identification (RFID) monitor may read the information on the microchip 201 through the antenna 202. In an embodiment, the tamper-resistant microchip assembly 200 is passive and requires no internal power source. The microchip 201 may contain pre-programmed information related to, for example, the contents of a bottle, such as, for example, the producer, geographic origin, vintage of production and/or year of a specific wine. The pre-programmed information may be stored on the microchip 201 prior to the insertion of the tamper-resistant microchip assembly 200 into the cork 210. The antenna 202 of the tamper-resistant microchip assembly 200 may be large and strong enough so as to be able to be detected and/or read through the cork 210 by, for example, an RFID reader located outside of the cork 210. The tamper-resistant microchip assembly 200 should be sturdy enough so as to not be damaged or disabled from normal handling of, for example, a bottle 220 in which the tamper-resistant microchip assembly 200 is inserted into the cork 210. The microchip 201/antenna 202/conductive connector 203 unit 444 is shown in FIG. 5 as being generally circular. It should be noted that the microchip 201/antenna 202/conductive connector 203 unit may be of any suitable shape which may accomplish its intended function.

Surrounding the cork 210 may be a ring 250 having an inner surface 258, an outer surface 259 and a height 283. The inner surface 258 may face and may be in contact with the cork 210 while the outer surface 259 may face and may be in contact with a neck of the bottle 220. The ring 250 may be generally circular and may have a circumference slightly larger than the outer circumference of the cork 210 so that the ring 250 may fit around the cork 210. The ring 250 may be secured to the outer surface of the cork 210 by, for example, glue or heated sealing. Alternatively, the ring 250 may be inserted over the cork 210 and secured by, for example, friction. Further, in an embodiment, the cork 210 may have a grove 555 (see FIG. 9) which receives at last a portion of the ring 250 and acts to help secure the ring 250 in place around the cork 210. More specifically, the groove 555 may be an indentation portion extending inward toward the center of the cork 210 and surrounding the circumference of the cork 210. Preferably the ring 250 is constructed from a plastic or metal; however, the ring 250 may be constructed from any suitable material. The ring 250 and the cork 210 should be constructed of a non-toxic material as both may be in contact with a beverage located within the bottle 220. The ring 250 may be permanently secured to the cork 210 such that the ring 250 remains around the cork 210 while the cork 210 is inserted and ultimately removed from the bottle 220.

The height 283 of the ring 250 may be preferably around at least ¼ of an inch. Providing a ring 250 having a large height 283 may prevent the ring 250 from inadvertently falling off the cork 210 or otherwise shifting with respect to its intended location.

The ring 250 of the tamper-resistant microchip assembly 200 may have a tapered lip portion 251 which may have an outer circumference 252 slightly larger than the remainder circumference of the ring 250. More specifically, most of the ring 250 may be snugly in contact with the cork 210 except for the tapered lip portion 251 which may extend outward from the cork 210. While in use the non-tapered portion of the ring 250 may be secured between the cork 210 and the bottle 220 while the tapered lip portion 251 of the ring 250 may be located substantially outside and above the top rim the bottle 220. More specifically, the tapered lip portion 251 may cover a portion of the rim of the bottle 220 such that it substantially prevents the insertion of an object, such as, for example, an ah so bottle opener from being inserted between the bottle 220 and the cork 210.

Located on the outer surface 259 of the ring 250 may be at least one abrasive structure 260. The abrasive structure 260 may be constructed from, for example, metal, diamond or the like. The abrasive structure 260 may have an abrasive surface which may face the inner wall of the neck of the bottle 220. During the removal of the cork 210 and therefore the surrounding ring 250 and attached abrasive structure 260 from the bottle 220, the abrasive structure 260 may scratch or otherwise permanently mark the inner neck of the bottle 220. Permanently marking the bottle 220 after removing the cork 210 may eliminate the chances of the bottle 220, and therefore its contents, from being counterfeited or otherwise accidentally filled with incorrect wine or liquid.

In FIGS. 5-8 the generally circular microchip 201/antenna 202/conductive connector 203 unit 444 may be located in a generally circular indented portion 275 located within the interior of the cork 210. The generally circular indented portion 275 may snugly fit the generally circular microchip 201/antenna 202/conductive connector 203 unit 444 such that the interior of the cork 210 snugly surrounds the top, bottom and sides of the generally circular microchip 201/antenna 202/conductive connector 203 unit 444. Further, the cork 210 may be a synthetic cork which is formed around the generally circular microchip 201/antenna 202/conductive connector 203 unit 444. FIGS. 5 and 6 illustrate the cork 210 in two sections, however, the cork 210 may remain as one solid piece. More specifically, FIGS. 5 and 6 show the cork 210 separated for illustrative purposes only so as the interior of the cork (namely, the microchip assembly) may be viewed.

Preferably, the generally circular microchip 201/antenna 202/conductive connector 203 unit 444 and corresponding indented portion 275 are located near the top end 445 of the cork 210 (roughly one-third of the way down into the cork 210). The generally circular microchip 201/antenna 202/conductive connector 203 unit 444 and indented portion 275 may be substantially parallel to the top and bottom side of the cork 210. Further, the generally circular microchip 201/antenna 202/conductive connector 203 unit 444 and indented portion 275 may substantially cover an interior horizontal cross section [A-A] of the cork 210 such that any object inserted down into the cork 210 from the top end will be highly likely of striking the generally circular microchip 201/antenna 202/conductive connector 203 unit 444. Only a small portion 281 near the outer wall of the cork 210 may be free of the generally circular microchip 201/antenna 202/conductive connector 203 unit 444 (see section A-A).

In an embodiment, located below a bottom surface 446 of the generally circular microchip 201/antenna 202/conductive connector 203 unit 444 may be generally rectangular reservoir 280. The reservoir 280 may be located directly below the generally circular microchip 201/antenna 202/conductive connector 203 unit 444 such that the portion of the generally circular microchip 201/antenna 202/conductive connector 203 unit 444 directly above the reservoir 280 may not support the generally circular microchip 201/antenna 202/conductive connector 203 unit 444. The generally circular microchip 201/antenna 202/conductive connector 203 unit 444 may be supported in the cork 210 by the cork 210 under the remaining surface area of the bottom surface 446 of the generally circular microchip 201/antenna 202/conductive connector 203 unit 444. The reservoir 280 may contain, for example, air, a vacuum, inert gas or other material. The air, a vacuum, inert gas or other material located within the reservoir 446 is preferably less resistant to penetration than the surrounding cork 210. As a result, an object (such as a corkscrew) 490 inserted downward through the cork 210 and onto the generally circular microchip 201/antenna 202/conductive connector 203 unit 444 may easily force the generally circular microchip 201/antenna 202/conductive connector 203 unit 444 to break or otherwise become disabled within the reservoir 280.

Preferably, the reservoir 280 is fairly shallow, measuring approximately two to three times the height of the height of the generally circular microchip 201/antenna 202/conductive connector 203 unit 444. Should the generally circular microchip 201/antenna 202/conductive connector 203 unit 444 break into two or more pieces as a result of the downward pressure from the object 490, the pieces may become trapped within the reservoir 280 or surrounding cork 210. As a result, none of the generally circular microchip 201/antenna 202/conductive connector 203 unit 444 may escape the interior of the cork 210 and enter the interior of the bottle 220.

In use, a person may insert the object 490, such as a corkscrew, downward into the top surface of the cork 210. The object 490 may first penetrate the upper interior portion of the cork 210. Because the object 490 is generally inserted near the center of the top surface 445 of the cork 210, the object 490 may strike and break or otherwise damage and inactivate the generally circular microchip 201/antenna 202/conductive connector 203 unit 444. Further, because the generally circular microchip 201/antenna 202/conductive connector 203 unit 444 covers a substantial horizontal cross section within interior of the cork 210, it becomes almost impossible to insert the object 490 through the cork 210 without breaking or otherwise inactivating the generally circular microchip 201/antenna 202/conductive connector 203 unit 444.

Once the object 490 is inserted deep enough within the interior of the cork 210, the user may pull upward on the object 490 to remove the cork 210 from the bottle 220. The generally circular microchip 201/antenna 202/conductive connector 203 unit 444 located within the interior of the cork 210 may therefore be removed from bottle 220 while still inside the interior of the cork 210. The cork 210 may then be discarded. The ring 250 surrounding the cork 210 may remain attached to, and may be removed along with, the cork 210.

Figure 9:
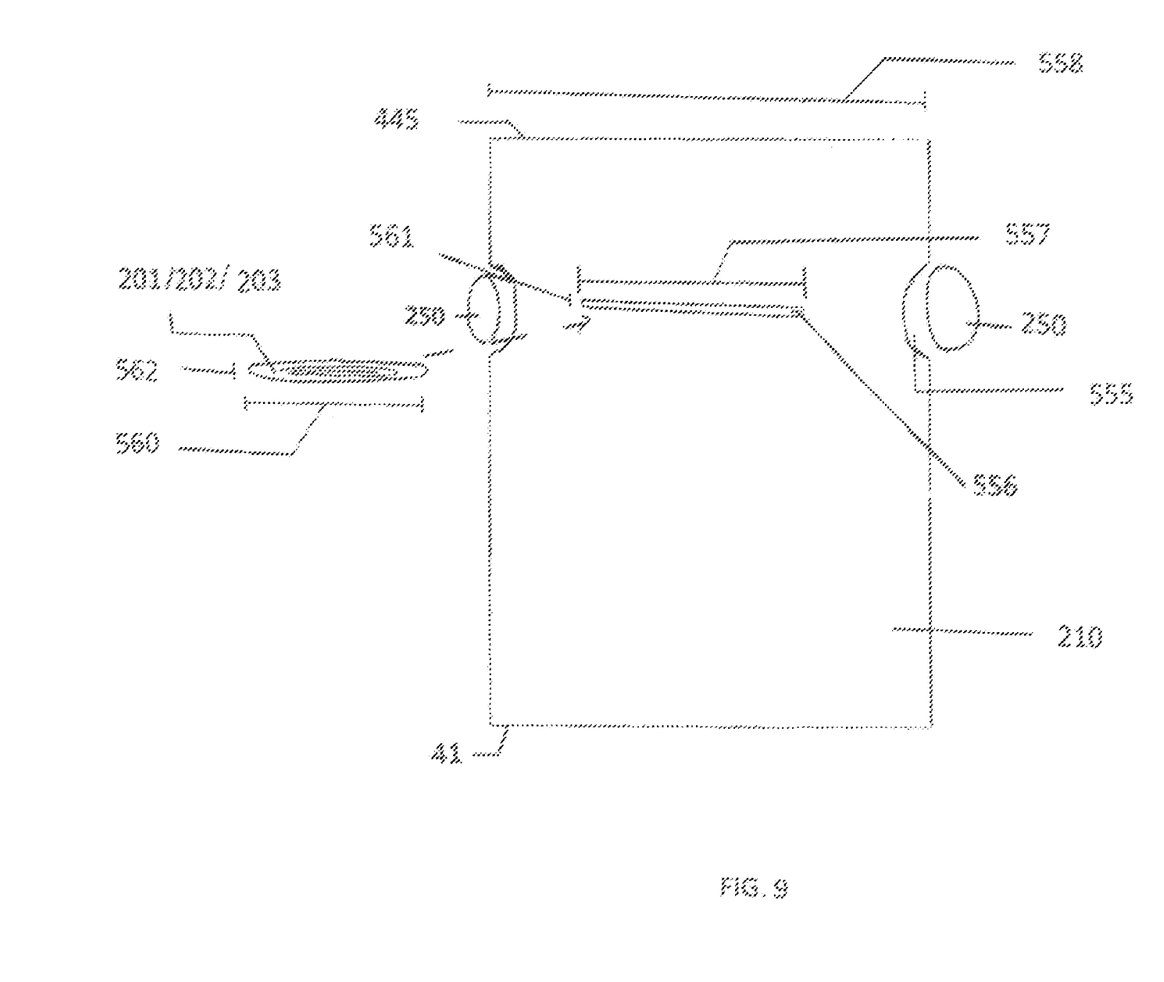
FIG. 9 illustrates a groove around the exterior surface of the cork.

Referring now to FIG. 9, a slit 556 may be present on the side of the cork 210 and may extend inward toward the center of the cork 210. The slit 556 may be generally parallel to the top surface 445 and the bottom surface of the cork 210. The slit 556 may have a length 557 which may be generally less than a diameter 558 of the cork 210. Further, the length 557 of the slit 556 may be slightly larger than a diameter 560 of the microchip 201/antenna 202/conductive connector 203 unit 444. Further, a height 561 of the slit 556 may be slightly larger than a height 562 of the microchip 201/antenna 202/conductive connector 203 unit 444. As a result, the microchip 201, antenna 202 and conductive connector 203 unit 444 may snugly be inserted into the slit 556 and moved toward the center of the cork 210. After the microchip 201/antenna 202/conductive connector 203 unit 444 is inserted snugly through the slit 556 and into the center of the cork 210, the slit 556 may then be at least partly covered by the ring 250 so as the microchip 201/antenna 202/conductive connector 203 unit 444 may not escape from the center of the cork 210.

Although embodiments of the present invention are shown and described therein, it should be understood that various changes and modifications to the presently preferred embodiments will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A cork for wine bottles and like comprising:
   a generally cylindrical cork having a closed top surface having a surface area, a closed bottom surface, a generally cylindrical side wall and an interior; and
   a generally circular microchip unit having a top surface having a surface area, a bottom surface, a height, and a diameter and wherein said generally circular microchip unit contains a microchip electrically connected to an antenna and wherein said generally circular microchip unit is entirely contained within the interior of the cork and wherein said top surface of said microchip unit is substantially parallel to said top surface of the cork.

2. The cork of claim 1 further comprising:
   a generally circular indentation portion surrounding the cork wherein the generally circular indentation portion extends inward from the generally cylindrical side wall toward the interior of the cork and wherein the generally circular indentation portion receives a support ring and wherein the generally cylindrical indentation portion, the support ring and the generally circular microchip unit occupy a common planar surface.

3. The cork of claim 1 further comprising:
   a concave reservoir area located between the generally circular microchip unit and the closed bottom surface of the cork and wherein the concave reservoir area traps a portion of the generally circular microchip unit upon a breaking of the generally circular microchip unit.

4. The cork of claim 1 wherein the surface area of the top side of the generally circular microchip unit is substantially equal to the surface area of the top surface of the cork.

5. The cork of claim 1 further comprising:
   a slit located on the generally cylindrical side wall of the cork wherein the slit has a height and a length slightly larger than a height and a diameter of the microchip unit and wherein the microchip unit is inserted through the slit into the interior of the cork and wherein the slit is subsequently covered by a support ring surrounding the generally cylindrical side wall of the cork.

6. The cork of claim 5 further comprising:

an extended lip portion of the ring wherein the extended lip portion has a circumference slightly larger than a circumference of the remaining portion of the ring and wherein the extended lip portion is tapered outward toward the top surface of the cork.

7. The cork of claim 5 further comprising:

a rivet located on an exterior wall of the support ring and in contact with the container wherein the rivet is constructed from a material having a higher rating on the Mohs scale than the surrounding container and wherein removal of the cork from the bottle forces the rivet to permanently scratch the container.

* * * * *